United States Patent [19]
Diebboll et al.

[11] Patent Number: 5,886,643
[45] Date of Patent: Mar. 23, 1999

[54] METHOD AND APPARATUS FOR DISCOVERING NETWORK TOPOLOGY

[75] Inventors: Robert S. Diebboll, Lincoln; Richard B. Wallace, Marlborough; Ferdinand Engel, Northboro, all of Mass.

[73] Assignee: Concord Communications Incorporated, Marlboro, Mass.

[21] Appl. No.: 715,186

[22] Filed: Sep. 17, 1996

[51] Int. Cl.[6] .................................................. H04J 1/16
[52] U.S. Cl. ............... 340/825.08; 395/839; 395/200.54; 370/245; 370/248; 370/252; 370/254
[58] Field of Search ......................... 340/825.08, 825.06, 340/825.17, 825.07; 395/284, 839, 800.01, 200.51, 200.54; 370/245, 248, 252, 254; 707/7; 1/1

[56] References Cited

U.S. PATENT DOCUMENTS

| | | | |
|---|---|---|---|
| 4,817,080 | 3/1989 | Soha | 370/252 |
| 5,097,469 | 3/1992 | Douglas | 370/245 X |
| 5,437,046 | 7/1995 | Bright et al. | 395/200.54 |
| 5,521,902 | 5/1996 | Ferguson | 370/248 |
| 5,546,540 | 8/1996 | White | 395/200.1 |
| 5,568,471 | 10/1996 | Hershey et al. | 370/245 |
| 5,572,674 | 11/1996 | Ernst | 395/200.51 |

*Primary Examiner*—Brian Zimmerman
*Assistant Examiner*—William H. Wilson, Jr.
*Attorney, Agent, or Firm*—Fish & Richardson P.C.

[57] ABSTRACT

A method of processing data from a plurality of probes which monitor traffic over a network, which includes a plurality of segments to which are connected a plurality of nodes, the method including the steps of polling the probes for monitoring data; receiving polled data from the plurality of probes; storing the polled data in a plurality of records, each of the records identifying at least a probe, a source node, a destination node, and a measure of traffic between the identified source node and destination node in that record; for a selected source-destination node pair, determining which of the plurality of probes produced a most complete report of traffic associated with that selected source-destination node pair; identifying those records among the plurality of records that designate both the probe which produced the most complete report of traffic and the selected source-destination node pair; and distinguishing within the plurality of records the identified records from the other records.

11 Claims, 6 Drawing Sheets

FIGURE 2

| Probe | TCT | Source | Dest. | Bytes | Packets | Protocol | Time | ΔT | TAG |
|---|---|---|---|---|---|---|---|---|---|
| $P_1$ | Y | B | A | # | # | -- | T1 | $t_{D1}$ | |
| $P_3$ | Q | B | A | # | # | -- | T1 | $t_{D2}$ | |
| $P_2$ | W | B | A | # | # | -- | T1 | $t_{D3}$ | |
| $P_4$ | Z | B | A | # | # | -- | T1 | $t_{D4}$ | X |
| $P_4$ | Z | C | A | # | # | -- | T1 | $t_{D5}$ | X |
| • | • | • | • | • | • | • | • | • | • |
| • | • | • | • | • | • | • | • | • | • |
| 72 | 74 | 76 | 78 | 80 | 82 | 84 | 88 | 90 | 92 |

FIGURE 6

| GROUP V | GROUP W | GROUP X | GROUP Y | GROUP Z |
|---------|---------|---------|---------|---------|
| F | C | D | B | A |
| I | G | J | E | H |
| * | * | * | K | * |
| * | * | * | * | * |
| * | * | * | * | * |

METHOD AND APPARATUS FOR DISCOVERING NETWORK TOPOLOGY

BACKGROUND OF THE INVENTION

The invention relates generally to computer networks, and more specifically to determining information representative of computer network topologies.

Network managers typically use commercially available network monitors or probes that are attached to the segments to collect the information about traffic over those segments. From a central location or distributed locations, the network manager periodically polls those monitors for the data that they have collected. With this collected data from the monitors, the network manager can use a reporting package to generate various reports about the operation and performance of the network. For example, often it is desirable to generate a report about the traffic load on each network segment or machine/server so as to identify overloaded segments and/or equipment which may have too many active nodes attached to them and under-utilized segments and/or equipment to which it may be desirable to transfer active nodes. However, to make an accurate report of the traffic that is generated and access patterns by nodes attached to a given segment, it is necessary to have some knowledge about which nodes are attached to which segments.

One common approach has been to provide a map of the network to the network manager's computer. Thus, the network manager knows a priori were every node is initially located and that information can be used to generate reports about network performance and utilization. Another approach is to use a commercially available tool which generates a map of the network by using what is referred to as a ping sweep. There are several problems with such approaches however. First, these approaches are generally quite slow. Secondly, the network manager has to determine where all of the nodes are located and then enter that information into the system. Thirdly, not all protocols have a ping capability. And fourth, if nodes are moved or the network reconfigured, the map immediately is out of date and must be revised before accurate and reliable reports about network activity and performance can be generated. Particularly in large networks, it is not at all unusual for nodes to be moved to different locations, for segments to be added or removed, and for other similar changes to be made to address the changing needs of the community that is using the network or to address local problems in the subnetworks which make up the entire network. Unfortunately, the network manager often is not aware of some of these changes so he or she will not know that the map that was originally entered is no longer accurate or, if that is known, how to change it to accurately reflect the new topology. Moreover, if the network manager is not aware that the topology of the network has changed, he or she may use erroneous information from an out-of-date map.

An alternative approach has been to use complex algorithms to create an actual map of the network. But such algorithms are time consuming and are prone to error.

Thus, there is a need for a better, efficient way of discovering what a network's topology is and using that information to help in generating reports about the network.

SUMMARY OF THE INVENTION

The invention is a technique for identifying and tagging the most important information that is retrieved from the probes and a way of developing from the retrieved probe data a view that identifies which nodes are attached to which segments (i.e., a way of developing a "map" of the network).

In general, in one aspect, the invention is a method of processing data from a plurality of probes which monitor traffic over a network. The network includes a plurality of segments to which are connected a plurality of nodes. The method includes polling the probes for monitoring data; receiving polled data from the plurality of probes; storing the polled data in a plurality of records, wherein each of the records identifies at least a probe, a source node, a destination node, and a measure of traffic between the identified source node and destination node in that record; for a selected source-destination node pair, determining which of the probes produced a most complete report of traffic associated with that selected source-destination node pair; identifying those records among the records that designate both the probe which produced the most complete report of traffic and the selected source-destination node pair; and distinguishing among the records the identified records from the other records.

Preferred embodiments include the following features. The distinguishing step involves tagging the identified records. The method further includes performing the determining step for each of a plurality of different source-destination node pairs. ALos, the method includes identifying a plurality of different source-destination node pairs for which the plurality records have data, and performing the determining step for each of said plurality of different source-destination node pairs. The method further includes generating a report about network activity by using only the tagged records. The step of determining includes: for each of the probes, aggregating the measure of traffic from all records which report traffic for the selected source-destination node pair to thereby generate a total measure of traffic; and determining which one of the probes yields a highest total measure of traffic, wherein the probe that yields a highest total measure of traffic is the probe that produced the most complete report of traffic.

In general, in another aspect, the invention is a method of processing data from a plurality of probes which monitor traffic over a network which includes a plurality of segments to which are connected a plurality of nodes. The method includes polling the probes for monitoring data; receiving polled data from the plurality of probes; storing the polled data in a plurality of records, wherein each of the plurality of records identifies at least a probe, a source node, a destination node, and a measure of traffic between the identified source node and destination node in that record; for a selected one of the plurality of nodes, determining which one of the probes produced a highest total measure of traffic associated with that selected node; forming a list for the identified probe; and adding the selected node to that list.

Preferred embodiments include the following features. The method further includes performing the determining, forming, and adding steps for other nodes of the plurality of nodes to thereby generate a plurality of lists, each associated with a different one of the probes. The method also includes performing the determining, forming, and adding steps for all nodes of the plurality of nodes; and it includes using information stored in the plurality of lists to generate a report about network activity.

In general, in still another aspect, the invention is a method of generating a view of a network from monitoring data collected from a plurality of probes which monitored traffic over the network which includes a plurality of segments to which are connected a plurality of nodes. The view is generated from data that was collected from the probes and is stored in a plurality of records, each of which identifies at least a probe, a source node, a destination node, and a measure of traffic between the identified source node and destination node in that record. The method includes the steps of for a selected one of the plurality of nodes, determining which one of the plurality of probes produced a highest total measure of traffic associated with that selected node; and forming a list for the identified probe and adding the selected node to that list.

The method is completely dynamic and determines on the fly what the best data is for any given node. That is, it operates in real time and it automatically adjusts for changes in node locations and network topology. Moreover, the results are available immediately. In contrast, with other existing technologies, the user either needs to enter the topology of the network before being able to generate certain types of reports about activity on the network or, if the process of generating the network topology is automated, the process is very slow.

The invention is very easy to use and it is able to readily get at all of the subnet—subnet relationships without requiring the user to create or enter any information such as network topology or view of the network. The invention provides a straightforward and dynamic scheme for generating a representation of the network topology. The network manager does not need to have a seed map to use this approach. However, if a seed map is available, the representation (i.e., the view of the network) can be used to populate the seed map with nodes attached to the correct segments. Indeed, the invention provides an efficient and reliable way of automatically updating any previously provided map of the network so that it accurately reflects actual changes in network topology.

Other advantages and features will become apparent from the following description of the preferred embodiment and from the claims.

BRIEF DESCRIPTION OF THE DRAWINGS

FIG. 2 shows a set of records such as are stored by the network management system;

FIG. 6 shows the view that would be generated for the network of FIG. 1.

DESCRIPTION OF THE PREFERRED EMBODIMENTS

Figure 1:
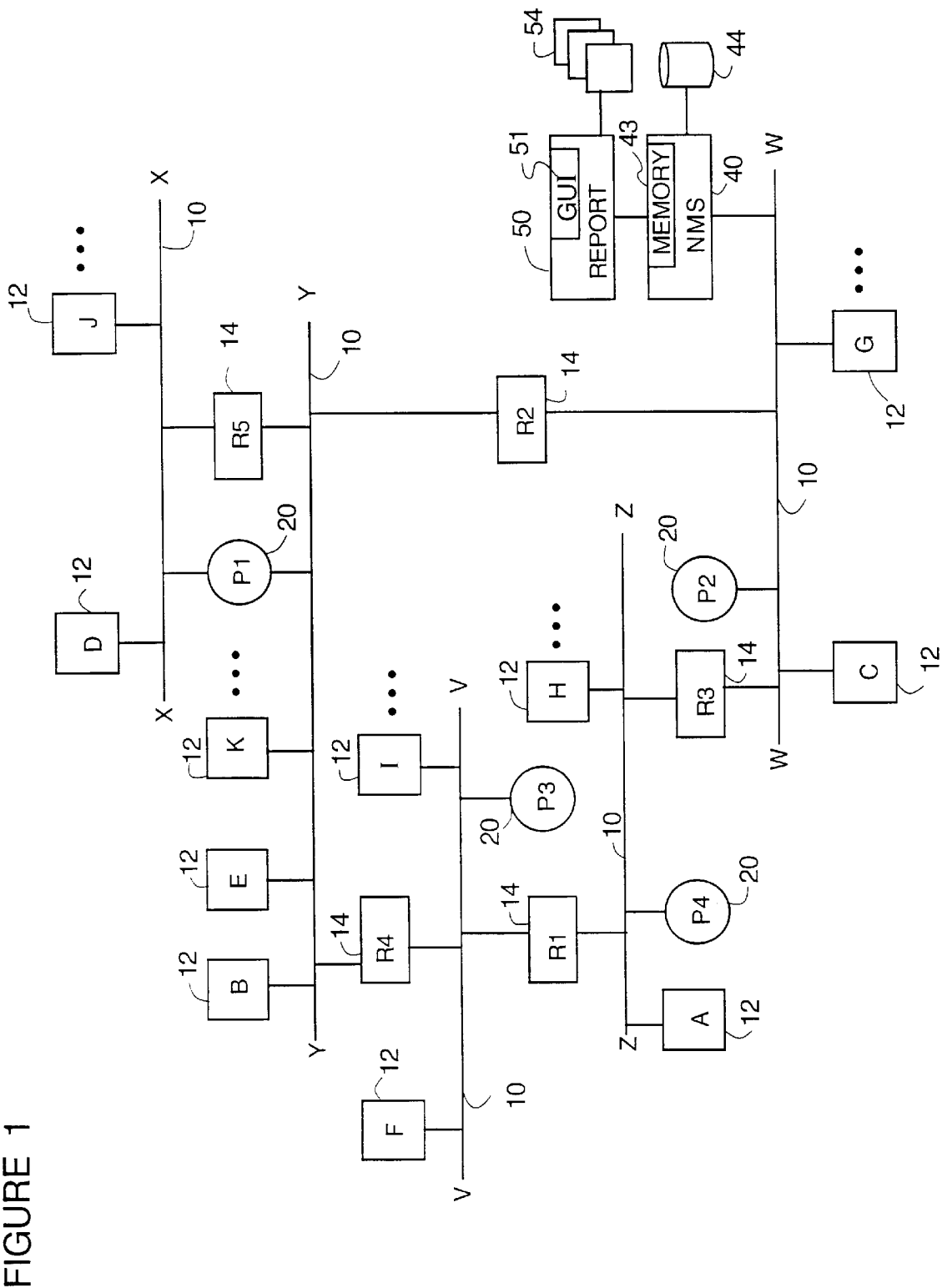
FIG. 1 shows a representative multi-segment network which will be used to explain the invention.

FIG. 1 shows a representative multi-segment network which will be used to described the invention. It includes five segments 10, which for ease of reference are also labeled V–Z. In this description, we intend to use the word segment in a broad sense. It is meant to cover any transmission medium (e.g. wire, optical fiber, Ethernet, Token Ring, etc.) to which nodes can be connected for communication with other nodes including for example, buses, coax, private lines, satellite lines, and public carrier lines and it is meant to include any topology including both ring and non-rings topologies and it is meant to cover multiple subnetworks.

One or more nodes 12, which for ease of reference are also labeled A–K, are connected to each of the segments 10.

The nodes 12 may be PC's, workstations, servers, or any other device of the type that can send and/or receive communications over the network. The nodes communicate with each other over the network using any appropriate communication protocol, e.g., TCP/IP, IPX, Appletalk, or any of the large number of other protocols. The communications are variously called conversations, dialogs, or connections. They can be connection type communications or connectionless communications, also referred to as state and stateless connections, respectively. According to a connection oriented protocol, one party establishes a connection with another party and then that connection is used to send communications between the parties. Whereas, according to a connectionless protocol, one party simply sends datagrams to the other party without first establishing a connection. The present invention applies to all types of systems.

In this example, the various segments 10 are interconnected by routers 16, which for ease of reference have been labeled R1 through R5. It should be understood, that network interconnection devices other than or in addition to routers can also be used, including, for example, bridges, gateways, multiplexors, switches, and connectors.

In the illustrated network, probes 20 are connected to some or all of the segments 10. The probes 20, which are labeled P1 through P4, are monitoring devices which collect and store data relating to the communications traffic over the network. Each probe includes a memory for storing the data that it collects through monitoring the activity (i.e., communications) on the segment of the network to which it is connected. The probes are commercially available devices, some of which can be very sophisticated pieces of equipment that include a high performance real time front end processor capable of analyzing the collected data to identify actual or potential problems and maintain statistical information for use in later analysis. The probes typically collect data in accordance with a known standard. One such standard, which was promulgated by the Internet Engineering Task Force, is referred to as RMON II which stands for Remote Monitoring II standard. RMON II specifies a protocol for communicating with the probe and it specifies the format of the Management Information Base (MIB), which defines the kinds of data that is stored and how to collect and retrieve that data.

A probe is meant to include any machine on a network that collects and stores information about traffic it has seen. A probe could be individual device that is connected directly to the network or it could be part of another device, such as a server, an intelligent hub, a router, or a switch which is part of the network. A probe could be either active or passive. In addition, a probe could be a device that looks at multiple segments. For example, as shown in FIG. 1, probe P1 is connected to both segment X and segment Y and it monitors both segments. The probe could also be a monitoring device that can roam over multiple segments. Probes that roam are typically embedded in switches which allow multiple point-to-point connections to be established. Such switches can have as many as 72 ports. Since a single probe is typically not able to monitor all of the multiple possible connections simultaneously, it operates by attaching to different connections at different times, i.e., by roaming among the connections.

Also note that the thing that the probe is connected to,(i.e., what we have called the segment) can range from a single server to a very complex subnetwork including multiple interconnected segments with multiple workstations and servers attached to those segments.

Also connected to one of the segments of the network (e.g. segment W as shown) is a Network Management System (NMS) 40. The NMS is typically implemented by an application program running on a separate workstation that is connected to the network and which provides a user interface through which the network manager can obtain information on network traffic and performance and troubleshoot network problems. The NMS, which includes a large internal memory 43 and external storage (e.g. disks) 44, retrieves and analyzes data that is collected by the probes distributed throughout the network and stores the results in external storage 44.

The NMS includes a report generator 50 which is typically in the form of applications software which enables the network manager to analyze the retrieved data, and generate and display various user-definable performance and utilization reports. There are also many commercially available separate reporting packages which may be used to generate the reports. In general, they are capable of putting out a wide variety of different kinds of information and in different forms. The reported information can range anywhere from raw data (i.e., source/destination/protocol type/bytes/etc.) to the more common forms which are reports (e.g. pie charts, scatter grams, histories, etc.).

There is typically a GUI associated with the reporting package which allows the user to tailor the report that is to be generated. For example, the network manager can ask the system to identify all of the servers that a particular node is talking to; to identify all of the traffic between two identified nodes; to identify the protocols that are being used over a particular line; etc, The NMS periodically (e.g. every 10 minutes) polls the probes for collected data. This retrieved data from the probes is stored in a database in external storage 44 as records, each one associated with conversations between a particular source-destination node pair. One problem, however, is that there is a huge amount of data that is retrieved and stored in the NMS database. It is not unusual for the amount of data to be in the gigabytes. Another problem is that much of the data that is retrieved from the probes is necessarily duplicative and it also represents an incomplete view of the communications that took place between the designated nodes. That this is true can be readily appreciated from the following simple example.

Referring to FIG. 1, if node A talks to node B, then probe P4 will see that conversation and will record the number of packets that it sees. Thus, in the database of probe P4, there will be a record of the conversation between A and B including, for example, the number of packets sent, the time, and the identities (e.g. addresses) of the source node and destination node. If probe P4 is a sophisticated monitoring device, it may also be able to detect and log many other details about the conversation, including for example, the protocol, the type of protocol, the application, etc.

If the packets successfully transfer through router R1, probe P3 will also see the same conversation and thus probe P3's database will also contain a record of what it saw. In other words, its database will contain data that is duplicative of the data that is contained in the database of probe P4. However, it is possible that problems might occur which prevent router R1 from passing on the packets sent by node A. For example, router R1 might be too busy and it will reject some of the packets sent by node A to node B. Or possibly the router R1 may be malfunctioning or down. Some of the packets might simply be discarded and never reach the destination node. Indeed, in large, very complex systems, there will almost always be losses of packets. Thus, probe P4 may see packets that never reach the segment which is being monitored by probe P1. Or, as is often the case, the packets from node A may be directed to node B over some other path, e.g. through routers R3 and R4. In that case, probe P3 will not have a record of that traffic but probe P2 will. In this second scenario, the intermediate probes between nodes A and B (e.g. probes P3 and P2) will have incomplete (i.e., inaccurate) pictures of the traffic from node A to node B. The probe that will have the most complete (i.e., the best) picture of traffic that is sent from node A and that is addressed to node B will be probe P4.

The Tagged Data

As described in greater detail below, during each polling period, the NMS implements an algorithm which identifies and tags a subset of all of the data retrieved from the probes. That subset of the data represents the best picture of the monitored conversations of the identified source-destination node pairs. Later, when the reporting software is called upon to prepare certain reports on conversations among specified node pairs, it uses the subset of tagged data and ignores the non-tagged data.

Referring to FIG. 2, the NMS stores the data that is retrieved from the probes during each polling period as records 70 in its database. The records that are generated in the database of the NMS and the information that is stored in those records are representative of what is typically collected by currently existing NMS systems with at least one important exception, namely, a Tag field 92. The tag field is used to flag the records containing the best information about the traffic between the two identified nodes, i.e., the source and destination nodes. An example of the format of a typical set records is shown in FIG. 2.

The records of the described embodiment include the following fields: (1) a probe field 72 for identifying the probe which provided the data; (2) a TCT (Thing-Connected-To) field 74 which identifies the segment to which the probe is attached (i.e., the segment which was being monitored); (3) a source field 76 which identifies the node which sent the packets or data that was detected by the probe; (4) a destination field 78 which identifies the intended recipient of the packets or data; (5) a bytes field 80 which specifies the number of bytes that were transferred by the source and addressed to the destination node; (6) a packets field 82 which specifies the number of packets that were sent by the source node and addressed to the destination node; (7) a time field 88 which specifies the time at which the NMS polled the probe for the data; (8) a $\Delta T$ field 90 which specifies the length of the period of time for which the data in the bytes and packets fields was gathered; and the previously mentioned tag field 92 which is used to identify the records with the best information about the conversation that is represented by that record. In the described embodiment, these records are sorted by source node prior to storing them in the database.

The records shown in FIG. 2 also include a protocol field 84 which identifies the protocol used for the monitored communications between the two nodes. It should be understood that there may be other fields in the records for additional information. What fields are used is a design consideration that depends upon the probes that are used and the types of reports that the NMS system will need to generate. The other fields, however, are not of particular importance to the invention described herein and thus only a representative selection is shown.

The $\Delta T$ is easily calculated by taking the difference between the time of the current poll and the last poll of that probe. It is helpful to make $\Delta T$ be the same for a given polling period, however, it is more likely that the entries in this field will be different for each of the records for a given poll period.

It should be again noted that a vast amount of information is typically gathered during each polling period. Thus, FIG. 2 cannot really do justice to the amount of data that is stored in the database for each probe for each polling period, since the number of records for each probe is typically very large. FIG. 2 is simply meant to illustrate the structure of the database and provide a simple example of how the invention works.

The NMS collection algorithm receives data from the probes and stores that data in records as described above. Since the records include a considerable amount of duplicate information, the NMS identifies and tags the records which represents the best data, and then stores the records in the database along with the tags. In general, the algorithm identifies the records to tag by looking at the total traffic for each probe for a given source-destination node pair and it picks the one that has seen the most traffic for that pair.

Figure 3:
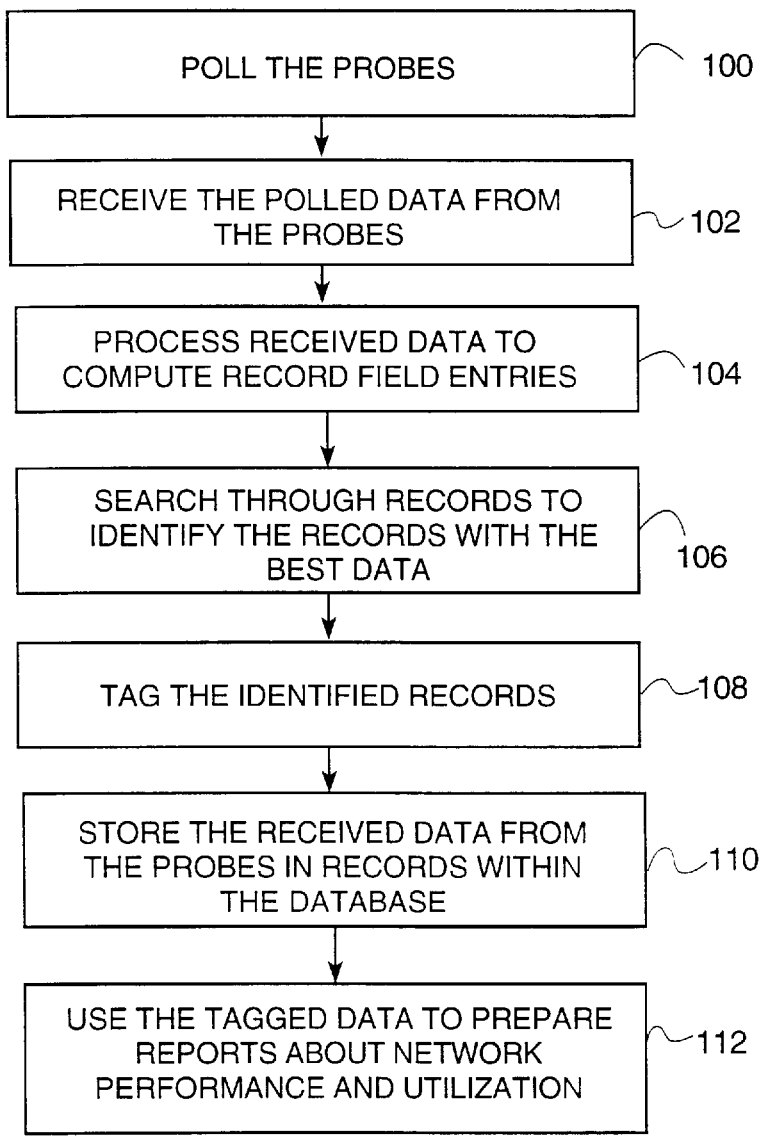
FIG. 3 is a flow chart of the high level operation of the network management system.
Figure 4:
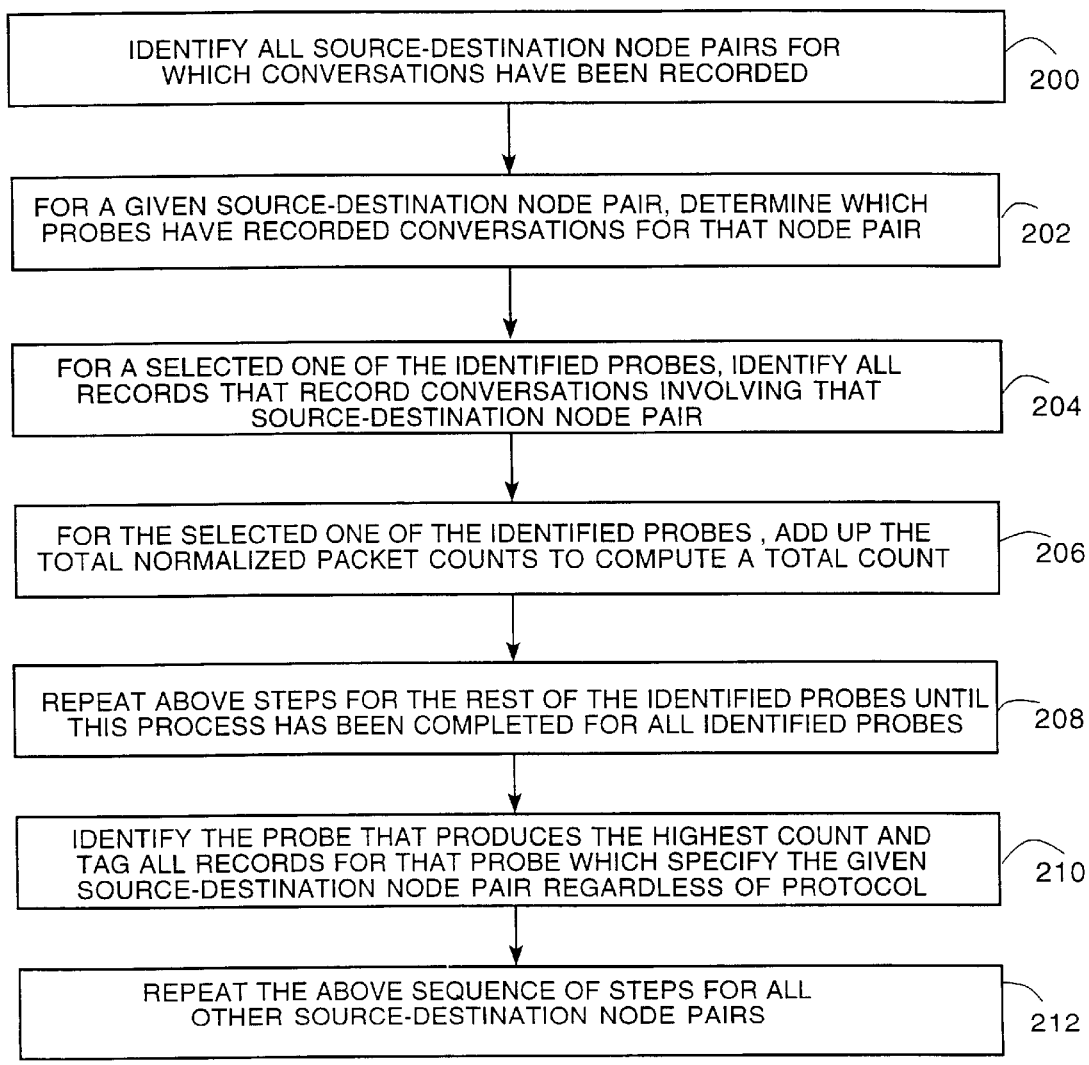
FIG. 4 is a flow chart of the algorithm which tags the collected data.

The algorithm operates as shown in FIGS. 3 and 4. It causes the NMS to periodically poll all of the probes for all of the data that they have collected in the interim period since the last poll (step 100). In response, each probe sends back its current data to the NMS, which receives the data and stores it in records in active memory (step 102). The NMS also processes the received data to determine certain additional information that must be entered into the records along with the retrieved data, e.g. $\Delta T$, packet count, etc. (step 104). For example, since each of the probes typically has counters which maintain accumulated counts of all traffic seen since some initial time, the probe sends back the current contents of those counters and it is up to the NMS to compute the amount of traffic that has occurred since the last polling period. To facilitate this, the NMS stores in its active memory the last received packet count for each source-destination node pair. When the NMS receives the results of the next poll, it computes the entry that is stored in the packet count field 82 of the records (see FIG. 2) by subtracting the current retrieved count from the received count for the last polling period that it had previously stored in memory.

When all of the appropriate information has been computed and entered into the stored records for the current polling period, the NMS then identifies for each source-destination node pair which particular probe has provided the best data for the traffic for that node pair (step 106). The NMS then tags the records for that probe by appropriately marking the tag field (step 108). Once this process has been completed for all source-destination node pairs and all of the appropriate records have been tagged, the NMS stores the records along with the tags in the database (step 110).

For each polling period, the NMS identifies the records that are to be tagged in the manner shown in FIG. 4. The algorithm identifies all of the source-destination node pairs for which monitoring data has been received (step 200). Then, for a selected one of those source-destination node pairs, the algorithm identifies which probes have records of conversations for that node pair (step 202). The algorithm selects one of the identified probes and identifies all of the records for that probe which specify the selected source-destination node pair regardless of protocol (step 204). The protocol is ignored because different probes can be configured to look at different levels of the protocol. Thus, records containing data about the same conversation may be labeled by different protocols among the various records retrieved by the NMS.

For all of the records identified in step 204, the NMS normalizes the packet counts that are recorded in each of the associated records and adds up the resulting numbers to produce a total count for the selected source-destination node pair and for the selected probe (step 206). The NMS computes the normalized counts simply by computing an average rate, i.e. by dividing the recorded packet count by the $\Delta T$ stored in the same record. Then, the NMS repeats the same sequence (i.e., steps 204 and 206) for each of the other probes identified in step 200 (step 208). After the total counts have been computed for all of the identified probes, the NMS identifies the probe with the highest total count (step 210). That probe is the one with the best data about the conversations between the selected source-destination node pair and the NMS tags all of the records for that probe which designate that source-destination node pair regardless of the protocol that was monitored (step 210).

The NMS repeats the above-identified steps 202–210 for all of the source-destination pairs that were identified in step 200 for that polling period (step 212).

The tagged data is then used to generate conversation based reports. For example, the network manager might want to know the identity of the top N nodes in the network that have been involved in the largest volume of communications. To compile that report, the reporting software need only examine the tagged records. Other reports which can be generated based on only the tagged data are described below.

Note that if a probe is attached to the segment on which the node of interest is located, then this algorithm will, as expected, identify that probe as having the best data for conversations in which that node acts as a source node. However, the real benefit of the algorithm is realized in networks in which nodes are on segments to which there are no probes attached and in routed environments. In those environments, it is not self evident as to what records provide the best information about specific conversations.

A View of the Network:

The NNS further processes the stored records within the database to create a "view" of the network. This view of the network constitutes a representation of the actual map of the network, identifying where the nodes are located in terms of the identity of the probes (or the segments to which they are attached). The view is also referred to as a physical group list. It consists of a list for each probe (or segment) and each list identifies the nodes that appear to be connected to that probe (or segment).

In general, to determine where nodes are located (i.e., to which probe each node is closest), the algorithm finds which probes have logged the most traffic for which nodes. In other words, it scans all of the records within a user specified period of time and it aggregates total byte counts per node for each probe. After the total byte counts have been determined, the algorithm identifies for each node, the probe that yields the highest total byte count and adds the identity of that node to a list associated with the identified probe. The lists for the various probes represent the physical group list (or view) for the network and each list identifies the nodes that appear to be connected to or closest to the corresponding probe.

Figure 5:
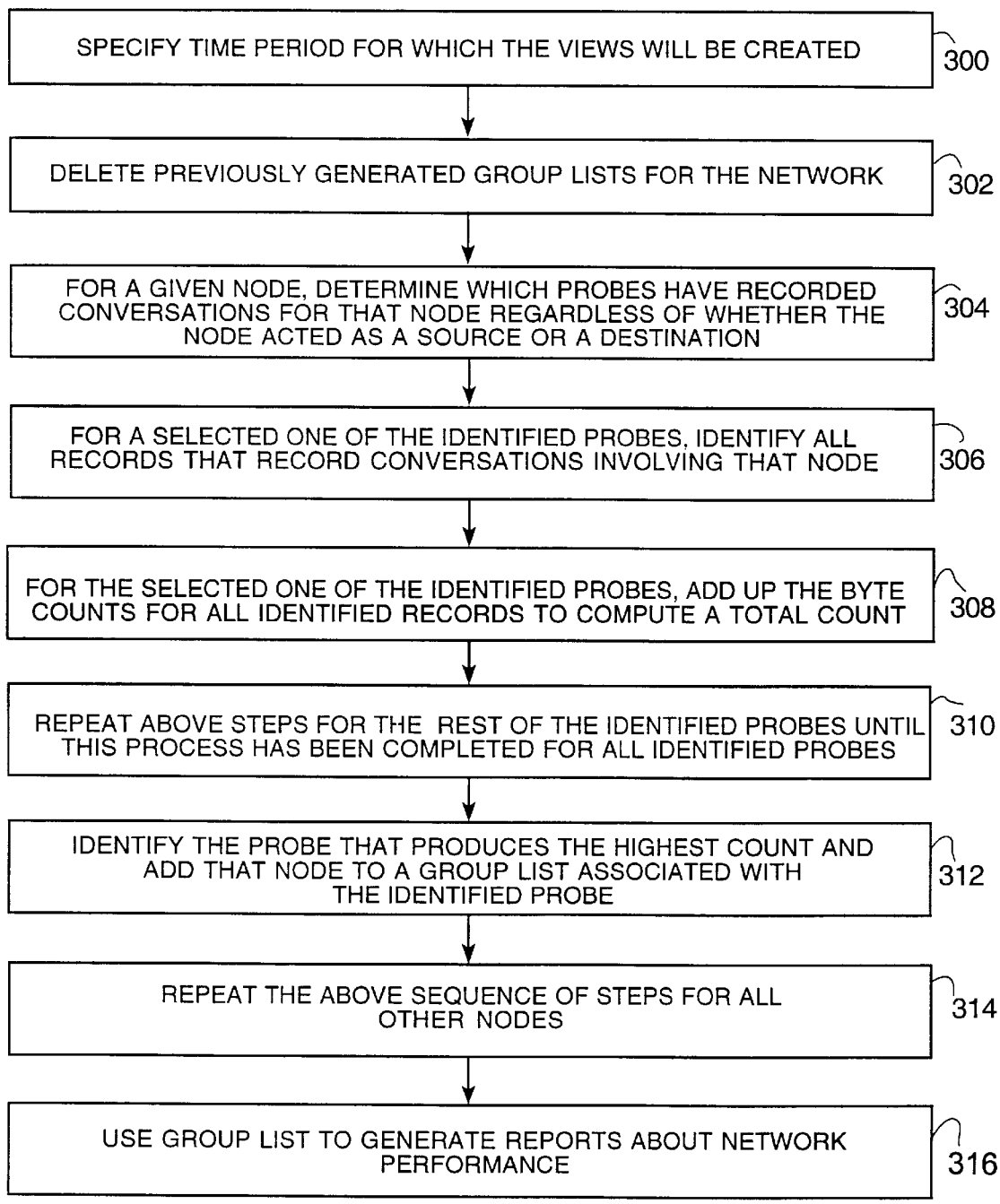
FIG. 5 is a flow chart of the algorithm for generating a view of the network (i.e., group lists)

A specific implementation of the algorithm for creating a view of the network is shown in FIG. 5. The algorithm can be implemented in either the NMS system itself or as part of the report generating software. First, the user or network manager specifies the time over which the view is to be created by entering a beginning time and an end time (step 300). So that a more stable view of the network is generated, the specified period of time should typically extend over multiple polling periods. The algorithm begins by deleting any previously generated group list (step 302). Then, for a given node (e.g. node A), the algorithm identifies all of the probes that have recorded traffic for that node acting either as a source or as a destination (step 304). For a selected one of the identified probes, the algorithm identifies all of the records for that probe which specify the selected node either as a destination or as a source (step 306). For all of the identified records, the algorithm adds up the byte counts to produce a total byte count (step 308). Then, it repeats the same sequence of operations (i.e., steps 304 to 308) for each of the other probes identified in step 304 (step 310). After the total counts have been computed for all of the identified probes, the algorithm identifies the probe with the highest total count (step 312). That probe is the probe which is assumed to be closest to the node of interest and the algorithm simply adds the node to a list for that probe, i.e., to a list identified by either the probe or the segment to which the probe is attached.

This process is then performed for all of the other nodes for which there are records in the database during the specified period of time (step 314).

If this procedure is performed for the network shown in FIG. 1, the resulting group list will likely be as shown in FIG. 6. There is a list for each of the probes or for each of the segments to which a probe is attached. Each list includes the nodes that appear to be closest to those segments. Note that it is possible that there is no probe attached to the particular segment to which the node is attached. In that case, the nearest probe will likely be identified as the probe to which the node is attached.

For example, in FIG. 1 assume that probe P1 has been configured to look only at segment Y and not at segment X. If somebody were to put a node up on segment X (e.g. node D), the network manager could not determine that it was connected to segment X, since there is no probe monitoring traffic on segment X. Rather, the system would indicate that it was connected to segment Y, i.e., the closest segment to segment X.

Instead of generating lists for all probes, as was described above, the algorithm can be configured to generate lists for the top N nodes that account for the most traffic. In that case, the counts would be stored with the nodes in the generated lists and once the algorithm evaluated all node, the top N nodes can be identified and the lists presented or displayed which show only those top N nodes.

The network manager can use the group lists to update any seed map that has been provided. Seed maps typically show segments without nodes attached, i.e. the network infrastructure.

Later when the network manager runs the report software to generate a report, the tagged data and/or the group lists are used to generate the report (step 112 in FIG. 3 and step 316 in FIG. 5). The following are examples of reports that can be generated by taking advantage of the tagged data and the physical group lists.

In the first example, we assume that all financial information is stored on server B and assume that nobody from segment W should ever touch that financial information. The network manager might want to see everybody from segment W who has talked with node B (e.g. a server) and how much they talked with node B. By using the tagged data, the report generator can gather that information very quickly and accurately. The report generator need only look at the tagged records for segment W (i.e., for probe P2) in which node B was identified as a destination. These records will produce an accurate view of the total traffic with node B from segment W.

In the second example, we assume that there is a set of servers on the network and that the network manager wants to repartition the network by moving some servers to different segments, e.g. move a server to the network segment X which might be in Chicago. The network manager may want the report generator to show him all other groups (i.e., segments) that are running traffic against Chicago. Using the group lists, the network manager can easily pull out the tagged data that gives the desired information. In other words, each list among the group lists identifies the set of nodes on the corresponding segment and the tagged data gives the most complete picture of the traffic that those nodes have generated. The report generator need only look at all of the tagged data for each probe that identifies a node in that group as a source and a node in the segment W group list as a destination. This will indicate by segment who is using Chicago's services and how much they are using those services.

Note that the network manager may also want to use the non-tagged data. In fact, one important reason for keeping the duplicate data (i.e., the non-tagged data) is that it enables one to easily determine what is going on over a given segment. For example, if the network manager wants to know who was using a particular line, he need only sum up all of the recorded activity for a given probe, including both tagged and non-tagged records. Thus, it is may be desirable to keep the non-tagged data rather than dumping it after.

The group lists also enable the report generator to easily produce what-if reports. For example, the network manager may want to know if node A is moved from segment Z to segment W, what is the impact? With the group list it is easy to generate two reports: one for segment Z and one for segment W. To create the report for segment Z, the report generator grabs all of the tagged data for all of the nodes that appear to be connected to segment Z which is monitored by probe P4. That is, the report generator grabs all of the tagged records for probe P4 which identify, as either a source or a destination, any of the members of the group list for segment Z. Similarly, it grabs all of the tagged data for all of the nodes that appear to be connected to segment Z which is monitored by probe P4. These two blocks of records enable the report generator to compute the current traffic load produced by the nodes that are attached to each of those segments. To identify the traffic generated by a single node, e.g. node A, the report generator grabs all of the tagged records which designate that node either as a source or a destination. The sum total of the traffic for those records represents the load generated by node A. To compute the impact on segment Z of removing node A from that segment, the report generator simply subtracts the load attributed to node A from the total load handled by segment Z. To compute the impact on segment W of adding node A to that segment, the report generator simply adds the load attributed to node A to the total load handled by segment W.

The TCT or segment can be identified in any of a number of ways. One possibility is to look at the subnet address which can be extracted from the node address. Another possibility is to have the probe create a unique marker that identifies the particular segment(s) to which it is attached. The NMS can then translate this marker or the subnet address into a human understandable form. Alternatively, the identity of the probe itself can be the TCT, in which case the TCT field would not be required.

We should also note that the address associated with the node is what is actually recorded in the probes. And there may be multiple addresses associated with a given node. Thus, the different addresses for a given node may need to be mapped to a single node identifier. Procedures for performing this mapping, i.e., for determining which addresses map to the same node, are well known to persons skilled in the art. In general, one way of figuring out what addresses belong to a particular node is to keep an address table which indicates which addresses (e.g. IP and IPX addresses) have been associated with a given MAC address. Once we find the association of address to a given MAC address, we go to a naming service, e.g. NIS, to find the name of the particular machine. This could be done for each polling period.

In the described embodiment, the tagging algorithm looks at the number of packets transferred as the measure of traffic. However, it could also look at some other measure of traffic such as the number of bytes transferred. Also, though we have described both the NMS and the database as being centralized, it should be understood that either or both could also be distributed.

The tagging described above occurred just after the polled data was received and prior to storing the records in the database. It could, however, have occurred at a later time after the records are stored in the database. In that case, the tag fields of all of the stored records would be empty and later, during a post processing phase, the algorithm would add tags to the appropriate records. In other words, it is the tagging that is of central importance, not the time at which the tagging occurs.

We have described the polling process as something which is performed by the NMS from a location that is remote from the probes. However, it is also possible the probes themselves can perform the polling and store the results, i.e., the polled data, on a local disk. Then, at the end of the day or at some predetermined time, the stored polled data from the probes would be bulk transferred to the NMS, which would then perform further processing of the data, as described above. It is intended that the invention will cover that alternative approach, as well as others.

Other embodiments are within the following claims.

What is claimed is:

1. A method of processing data from a plurality of probes which monitor traffic over a network, said network including a plurality of segments to which are connected a plurality of nodes, said method comprising:

polling said probes for monitoring data;

receiving polled data from the plurality of probes;

storing the polled data in a plurality of records, wherein each of said plurality of records identifies at least a probe, a source node, a destination node, and a measure of traffic between the identified source node and destination node in that record;

for a selected source-destination node pair, determining which of said plurality of probes produced a most complete report of traffic associated with that selected source-destination node pair;

identifying those records among said plurality of records that designate both the probe which produced the most complete report of traffic and the selected source-destination node pair; and distinguishing within said plurality of records the identified records from the other records.

2. The method of claim 1 wherein the distinguishing step comprises tagging the identified records.

3. The method of claim 2 further comprising performing the determining step for each of a plurality of different source-destination node pairs.

4. The method of claim 3 further comprising generating a report about network activity by using only the tagged records.

5. The method of claim 2 further comprising identifying a plurality of different source-destination node pairs for which the plurality records have data and performing the determining step for each of said plurality of different source-destination node pairs.

6. The method of claim 2 wherein the step of determining comprises:

for each of said plurality of probes, aggregating the measure of traffic from all records which report traffic for the selected source-destination node pair to thereby generate a total measure of traffic; and determining which one of said plurality of probes yields a highest total measure of traffic, wherein the probe that yields a highest total measure of traffic is the probe that produced the most complete report of traffic.

7. A method of processing data from a plurality of probes which monitor traffic over a network, said network including a plurality of segments to which are connected a plurality of nodes, said method comprising:

polling said probes for monitoring data;

receiving polled data from the plurality of probes;

storing the polled data in a plurality of records, wherein each of said plurality of records identifies at least a probe, a source node, a destination node, and a measure of traffic between the identified source node and destination node in that record;

for a selected one of said plurality of nodes, determining which one of said plurality of probes produced a highest total measure of traffic associated with that selected node;

forming a list for the identified probe; and adding the selected node to that list.

8. The method of claim 7 further comprising performing the determining, forming, and adding steps for other nodes of said plurality of nodes to thereby generate a plurality of lists, each associated with a different one of said probes.

9. The method of claim 8 further comprising performing the determining, forming, and adding steps for all nodes of said plurality of nodes.

10. The method of claim 8 further comprising using information stored in said plurality of lists to generate a report about network activity.

11. A method of generating a view of a network from monitoring data collected from a plurality of probes which monitored traffic over the network, said network including a plurality of segments to which are connected a plurality of nodes, wherein said view is generated from data that was collected from said probes and is stored in a plurality of records, each of which identifies at least a probe, a source node, a destination node, and a measure of traffic between the identified source node and destination node in that record, said method comprising:

for a selected one of said plurality of nodes, determining which one of said plurality of probes produced a highest total measure of traffic associated with that selected node; and forming a list for the identified probe and adding the selected node to that list.

* * * * *